(12) United States Patent
Tomita et al.

(10) Patent No.: US 9,350,033 B2
(45) Date of Patent: May 24, 2016

(54) FUEL CELL SYSTEM

(71) Applicant: NISSAN MOTOR CO., LTD., Kanagawa (JP)

(72) Inventors: Yousuke Tomita, Yokohama (JP); Keigo Ikezoe, Ayase (JP); Fumio Kagami, Yokohama (JP)

(73) Assignee: NISSAN MOTOR CO., LTD., Yokohama-Shi, Kanagawa (JP)

( * ) Notice: Subject to any disclaimer, the term of this patent is extended or adjusted under 35 U.S.C. 154(b) by 160 days.

(21) Appl. No.: 14/371,103

(22) PCT Filed: Jan. 10, 2013

(86) PCT No.: PCT/JP2013/050261
§ 371 (c)(1),
(2) Date: Jul. 8, 2014

(87) PCT Pub. No.: WO2013/105590
PCT Pub. Date: Jul. 18, 2013

(65) Prior Publication Data
US 2015/0004506 A1    Jan. 1, 2015

(30) Foreign Application Priority Data

Jan. 10, 2012    (JP) ................ 2012-002278

(51) Int. Cl.
*H01M 8/04*    (2016.01)
*H01M 8/10*    (2016.01)

(52) U.S. Cl.
CPC ........ *H01M 8/04753* (2013.01); *H01M 8/0432* (2013.01); *H01M 8/04089* (2013.01); *H01M 8/04388* (2013.01); *H01M 8/04395* (2013.01); *H01M 8/04492* (2013.01); *H01M 8/04641* (2013.01); *H01M 8/04649* (2013.01); *H01M8/04952* (2016.02); *H01M 8/04141* (2013.01); *H01M 8/04358* (2013.01); *H01M 2008/1095* (2013.01); *Y02E 60/50* (2013.01)

(58) Field of Classification Search
CPC ................ H01M 8/04753; H01M 8/04089; H01M 8/04641; H01M 8/04032; H01M 8/04395

See application file for complete search history.

(56) References Cited

U.S. PATENT DOCUMENTS

2004/0018404 A1*    1/2004    Kojima ............. H01M 8/04223
429/431

(Continued)

FOREIGN PATENT DOCUMENTS

JP    2006-185605 A    7/2006
JP    2006-286436 A    10/2006

(Continued)

*Primary Examiner* — Stewart Fraser
(74) *Attorney, Agent, or Firm* — Young Basile Hanlon & MacFarlane P.C.

(57)    ABSTRACT

A fuel cell system includes a cathode gas supply unit, a cathode pressure detection unit, a fuel cell temperature detection unit configured to detect a temperature of the fuel cell, an internal resistance detection unit configured to detect an internal resistance of the fuel cell, a target cathode flow rate calculation unit configured to calculate a target cathode flow rate necessary for supply to the fuel cell based on an operating state of the fuel cell system, a cathode flow rate estimation unit configured to estimate a flow rate of the cathode gas according to the pressure of the cathode gas, the temperature of the fuel cell and the internal resistance of the fuel cell, and a cathode flow rate control unit configured to control the cathode gas supply unit based on the target cathode flow rate and the estimated flow rate of the cathode gas.

11 Claims, 13 Drawing Sheets

(56) References Cited

U.S. PATENT DOCUMENTS

| | | |
|---|---|---|
| 2006/0159970 A1 | 7/2006 | Kato et al. |
| 2006/0263653 A1 | 11/2006 | Sinha et al. |
| 2010/0167146 A1* | 7/2010 | Takeguchi ......... H01M 8/04007 429/432 |
| 2011/0294026 A1* | 12/2011 | Hamada ............ H01M 8/04388 429/432 |

FOREIGN PATENT DOCUMENTS

| | | |
|---|---|---|
| JP | 2008-282781 A | 11/2008 |
| JP | 2009-211935 A | 9/2009 |

\* cited by examiner

FUEL CELL SYSTEM

CROSS REFERENCE TO RELATED APPLICATION

The present application claims priority to Japanese Patent Application No. 2012-002278, filed Jan. 10, 2012 and is incorporated herein in its entirety.

TECHNICAL FIELD

This invention relates to a fuel cell system.

BACKGROUND ART

JP2006-286436A discloses a conventional fuel cell system in which a wet state of an electrolyte membrane is controlled to a desired wet state by controlling a flow rate and a pressure of cathode gas to be supplied to a fuel cell.

SUMMARY OF INVENTION

In a fuel cell system, a flow rate of the cathode gas to be supplied to a fuel cell needs to be accurately controlled according to a request so that output power of the fuel cell becomes target output power and flooding is prevented. However, in the aforementioned conventional fuel cell system, accuracy in controlling the flow rate of the cathode gas was poor due to a variation of an air flow sensor for detecting the flow rate of the cathode gas and the flow rate of the cathode gas could not be accurately controlled to a target value.

Then, a voltage drop occurs, for example, if the flow rate of the cathode gas to be supplied to the fuel cell becomes lower than a flow rate necessary to adjust the output power of the fuel cell to the target output power. Thus, the target value of the flow rate needs to be set larger than necessary for safety, wherefore power consumption of a cathode compressor increases to degrade fuel economy.

Since a voltage drop also occurs when the flow rate of the cathode gas to be supplied to the fuel cell becomes lower than a flow rate necessary to prevent flooding, fuel economy is degraded for the same reason as above.

The present invention was developed in view of such problems and aims to provide a fuel cell system capable of accurately estimating a cathode gas flow rate.

According to a certain aspect of the present invention, a fuel cell system is provided which includes a cathode gas supply unit configured to supply cathode gas to a fuel cell, a cathode pressure detection unit configured to detect a pressure of the cathode gas to be supplied to the fuel cell, a fuel cell temperature detection unit configured to detect a temperature of the fuel cell, an internal resistance detection unit configured to detect an internal resistance of the fuel cell, a target cathode flow rate calculation unit configured to calculate a target cathode flow rate necessary for supply to the fuel cell based on an operating state of the fuel cell system, a cathode flow rate estimation unit configured to estimate a flow rate of the cathode gas according to the pressure of the cathode gas, the temperature of the fuel cell and the internal resistance of the fuel cell, and a cathode flow rate control unit configured to control the cathode gas supply unit based on the target cathode flow rate and the estimated flow rate of the cathode gas.

Embodiments and advantages of the present invention are described in detail below with reference to the accompanying drawings.

DESCRIPTION OF EMBODIMENT (First Embodiment)

In a fuel cell, an electrolyte membrane is sandwiched between an anode electrode (fuel electrode) and a cathode electrode (oxidant electrode) and power is generated by supplying anode gas (fuel gas) containing hydrogen to the anode electrode and cathode gas (oxidant gas) containing oxygen to the cathode electrode. Electrode reactions which proceed in both the anode electrode and the cathode electrode are as follows.

$$\text{Anode electrode: } 2H_2 \rightarrow 4H^+ + 4e^- \qquad (1)$$

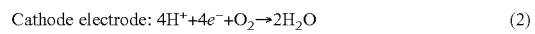

$$\text{Cathode electrode: } 4H^+ + 4e^- + O_2 \rightarrow 2H_2O \qquad (2)$$

The fuel cell generates an electromotive force of about 1 volt by these electrode reactions (1), (2).

In the case of using such a fuel cell as a power source for automotive vehicle, a fuel cell stack in which several hundreds of fuel cells are laminated is used since required power is large. Power for driving the vehicle is taken out by configuring a fuel cell system for supplying the anode gas and the cathode gas to the fuel cell stack.

Figure 1:
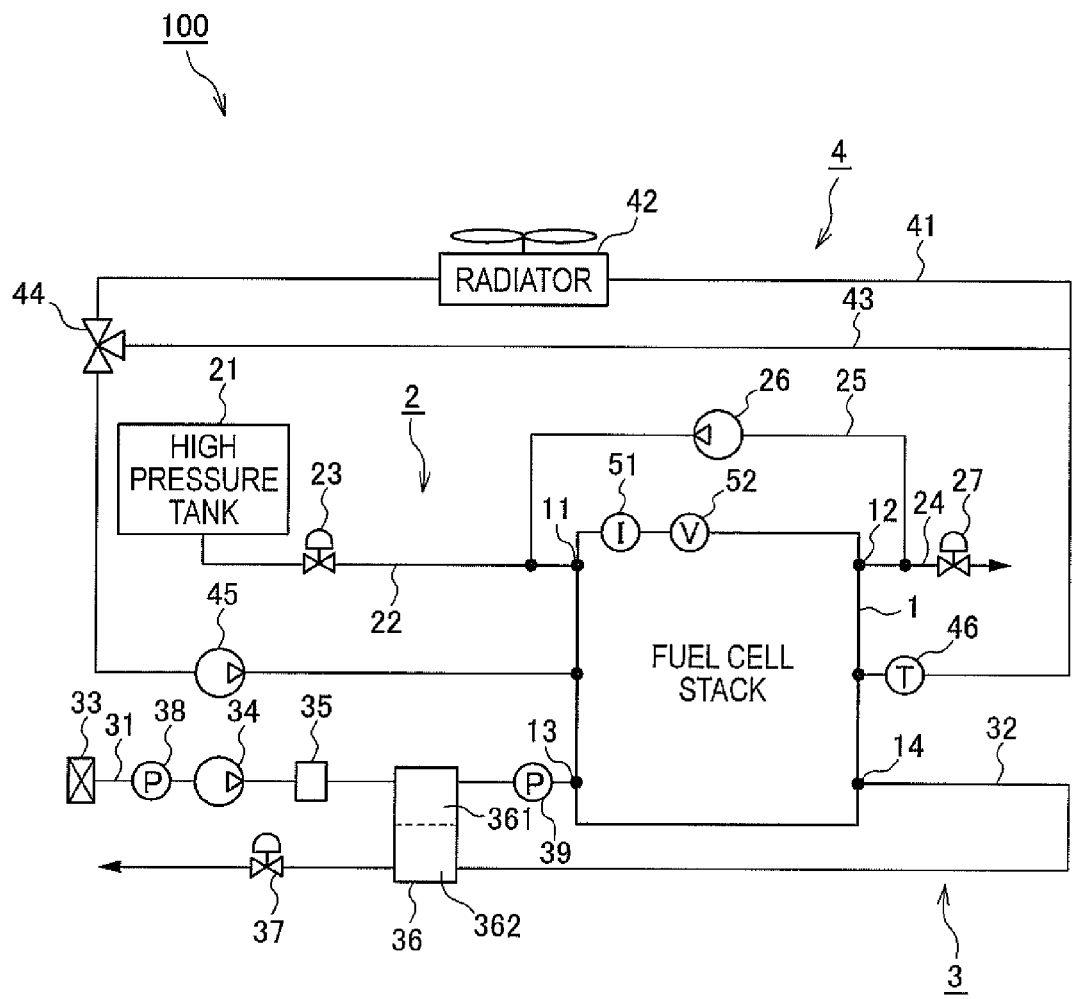
FIG. 1 is a schematic diagram of a fuel cell system according to a first embodiment of the present invention.

FIG. 1 is a schematic diagram of a fuel cell system 100 according to one embodiment of the present invention.

The fuel cell system 100 includes a fuel cell stack 1, an anode gas supply/discharge device 2, a cathode gas supply/discharge device 3, a stack cooling device 4 and a controller 5.

The fuel cell stack 1 is formed by laminating a plurality of fuel cells, generates power by being supplied with the anode gas and the cathode gas, and supplies the generated power to various electric devices such as a motor (not shown) necessary to drive the vehicle.

The anode gas supply/discharge device 2 includes a high pressure tank 21, an anode gas supply passage 22, an anode pressure regulating valve 23, an anode gas discharge passage 24, an anode gas recirculation passage 25, a recycle compressor 26 and a discharge valve 27.

The high pressure tank 21 stores the anode gas to be supplied to the fuel cell stack 1 in a high pressure state.

The anode gas supply passage 22 is a passage in which the anode gas to be supplied to the fuel cell stack 1 flows, wherein one end is connected to the high pressure tank 21 and the other end is connected to an anode gas inlet hole 11 of the fuel cell stack 1.

The anode pressure regulating valve 23 is provided in the anode gas supply passage 22. The anode pressure regulating valve 23 is controlled to be open and closed by the controller 5 to adjust a pressure of the anode gas flowing out from the high pressure tank 21 to the anode gas supply passage 22 to a desired pressure.

The anode gas discharge passage 24 is a passage in which anode off-gas discharged from the fuel cell stack 1 flows, wherein one end is connected to an anode gas outlet hole 12 of the fuel cell stack 11 and the other end is an open end. The anode off-gas is mixture gas of excess anode gas not used in the electrode reaction and inert gas such as nitrogen leaked from the cathode side.

The anode gas recirculation passage 25 is a passage for returning the anode off-gas discharged to the anode gas discharge passage 24 to the anode gas supply passage 22. One end of the anode gas recirculation passage 25 is connected to a side of the anode gas discharge passage 24 upstream of the discharge valve 27 and the other end thereof is connected to a side of the anode gas supply passage 22 downstream of the anode pressure regulating valve 23.

The recycle compressor 26 is provided in the anode gas recirculation passage 25. The recycle compressor 26 returns the anode off-gas discharged to the anode gas discharge passage 24 to the anode gas supply passage 22.

The discharge valve 27 is provided at a position of the anode gas discharge passage 24 downstream of a connecting part of the anode gas discharge passage 24 and the anode gas recirculation passage 25. The discharge valve 27 is controlled to be open and closed by the controller 5 to discharge the anode off-gas and condensed water to the outside of the fuel cell system 100.

The cathode gas supply/discharge device 3 includes a cathode gas supply passage 31, a cathode gas discharge passage 32, a filter 33, a cathode compressor 34, an air flow sensor 35, a water recovery device (hereinafter, referred to as "WRD") 36, a cathode pressure regulating valve 37, a first pressure sensor 38 and a second pressure sensor 39.

The cathode gas supply passage 31 is a passage in which the cathode gas to be supplied to the fuel cell stack 1 flows. One end of the cathode gas supply passage 31 is connected to the filter 33 and the other end thereof is connected to a cathode gas inlet hole 13 of the fuel cell stack 1.

The cathode gas discharge passage 32 is a passage in which cathode off-gas discharged from the fuel cell stack 1 flows. One end of the cathode gas discharge passage 32 is connected to a cathode gas outlet hole 14 of the fuel cell stack 1 and the other end thereof is an open end. The cathode off-gas is mixture gas of the cathode gas and steam produced by the electrode reaction.

The filter 33 removes foreign substances in the cathode gas taken into the cathode gas supply passage 31.

The cathode compressor 34 is provided in the cathode gas supply passage 31. The cathode compressor 34 takes in air (outside air) as the cathode gas into the cathode gas supply passage 31 via the filter 33 and supplies it to the fuel cell stack 1.

The air flow sensor 35 is provided downstream of the cathode compressor 34 in the cathode gas supply passage 31. The air flow sensor 35 detects a flow rate of the cathode gas flowing in the cathode gas supply passage 31 (hereinafter, referred to as "cathode flow rate").

The WRD 36 is a device for recovering moisture in the cathode off-gas and humidifying the cathode gas with the recovered moisture, and includes a humidifier 361 and a dehumidifier 362.

The humidifier 361 is provided downstream of the air flow sensor 35 in the cathode gas supply passage 31. The humidifier 361 humidifies the cathode gas to be supplied to the fuel cell stack 1.

The dehumidifier 362 is provided in the cathode gas discharge passage 32. The dehumidifier 362 dehumidifies the cathode off-gas flowing in the cathode gas discharge passage 32 and supplies the recovered steam to the humidifier 361.

The cathode pressure regulating valve 37 is provided downstream of the humidifier 362 of the WRD 36 in the cathode gas discharge passage 32. The cathode pressure regulating valve 37 is controlled to be open and closed by the controller 5 to adjust a pressure of the cathode gas to be supplied to the fuel cell stack 1 (cathode pressure) to a desired pressure.

The first pressure sensor 38 is provided upstream of the cathode compressor 34 in the cathode gas supply passage 31 and detects the pressure of the cathode gas.

The second pressure sensor 39 is provided downstream of the humidifier 361 of the WRD 36 in the cathode gas supply passage 31. The pressure sensor 39 detects the pressure of the cathode gas to be supplied to the fuel cell stack 1 (hereinafter, referred to as "cathode pressure").

The stack cooling device 4 is a device for cooling the fuel cell stack 1 and keeping the fuel cell stack 1 at a temperature suitable for power generation. The stack cooling device 4 includes a cooling water circulation passage 41, a radiator 42, a bypass passage 43, a three-way valve 44, a cooling water circulation pump 45 and a water temperature sensor 46.

The cooling water circulation passage 41 is a passage in which cooling water for cooling the fuel cell stack 11 is circulated.

The radiator 42 is provided in the cooling water circulation passage 41. The radiator 42 cools cooling water discharged from the fuel cell stack 1.

One end of the bypass passage 43 is connected to the cooling water circulation passage 41 and the other end thereof is connected to the three-way valve 44 so that the cooling water can be circulated while bypassing the radiator 42.

The three-way valve 44 is provided downstream of the radiator 42 in the cooling water circulation passage 41. The three-way valve 44 switches the circulation passage for the cooling water according to the temperature of the cooling water. Specifically, when the temperature of the cooling water is relatively high, the circulation passage for the cooling water is so switched that the cooling water discharged from the fuel cell stack 1 is supplied to the fuel cell stack 1 again via the radiator 42. Conversely, when the temperature of the cooling water is relatively low, the circulation passage for the cooling water is so switched that the cooling water discharged from the fuel cell stack 1 flows along the bypass passage 43 and is supplied to the fuel cell stack 1 again without via the radiator 42.

The cooling water circulation pump 45 is provided downstream of the three-way valve 44 in the cooling water circulation passage 41 to circulate the cooling water.

The water temperature sensor 46 is provided upstream of the radiator 42 in the cooling water circulation passage 41. The water temperature sensor 46 detects the temperature of the cooling water discharged from the fuel cell stack 1 (hereinafter, referred to as "stack temperature").

The controller 5 is configured by a microcomputer including a central processing unit (CPU), a read only memory (ROM), a random access memory (RAM) and an input/output interface (I/O interface). To the controller 5, signals from various sensors necessary to control the fuel cell system 100 such as a current sensor 51 for detecting an output current of the fuel cell stack 1, a voltage sensor 52 for detecting an output voltage of the fuel cell stack 1 and an accelerator stroke sensor 53 for detecting a depressed amount of an accelerator pedal besides the aforementioned air flow sensor 35, first pressure sensor 38, second pressure sensor 39 and water temperature sensor 46 are input.

The controller 5 calculates power necessary to drive the vehicle based on the detection signals of these various sensors (hereinafter, referred to as "required output power").

Further, to cause the fuel cell stack 1 to efficiently generate power, the controller 5 controls an internal moisture content of the fuel cell stack 1 by controlling the cathode flow rate, the cathode pressure and the stack temperature so that an electrolyte membrane of each fuel cell constituting the fuel cell stack 1 achieves a predetermined wet state where the electrolyte membrane is appropriately humidified.

The wet state of the electrolyte membrane is known to be correlated with an internal high frequency resistance (HER) (hereinafter, referred to as "internal resistance") of the fuel cell stack 1. If the internal moisture content of the fuel cell stack 1 is low and the electrolyte membranes are dry, the internal resistance increases and the output voltage of the fuel cell stack 1 decreases. On the other hand, if the internal moisture content of the fuel cell stack 1 is excessive, the dispersion of the anode gas and the cathode gas is obstructed and the output voltage decreases since electrodes of the fuel cell stack 1 are covered with moisture. Thus, the controller 5 controls the internal moisture content of the fuel cell stack 1 by controlling the cathode flow rate, the cathode pressure and the stack temperature so that the internal resistance of the fuel cell stack 1 reaches a predetermined target internal resistance.

Here, to improve the fuel economy of the fuel cell system 100, it is desirable to reduce the cathode flow rate as much as possible and operate the cathode compressor 34 at low rotation.

However, the cathode flow rate needs to be above a minimum flow rate necessary to make the output power of the fuel cell stack 1 reach at least the required output power (hereinafter, referred to as "minimum cathode flow rate"). Thus, when the internal resistance of the fuel cell stack 1 is converged to the target internal resistance, the cathode pressure and the stack temperature have to be controlled in some cases after the cathode flow rate is reduced to the minimum cathode flow rate.

Since cathode flow rate detection accuracy by the air flow sensor 35 tends to decrease with a decrease in the cathode flow rate, it has not been possible to actually reduce the cathode flow rate to the minimum cathode flow rate in an attempt to reduce the cathode flow rate to the minimum cathode flow rate. That is, the cathode flow rate can be reduced only to a flow rate, which is the minimum cathode flow rate plus a sufficient margin, thereby causing a problem of degrading fuel economy.

Accordingly, in the present embodiment, the cathode pressure and the stack temperature are controlled to adjust the internal resistance to the target internal resistance according to need while the cathode flow rate is accurately estimated and the cathode compressor 34 is controlled so that the estimated cathode flow rate does not fall below the minimum cathode flow rate.

A method for estimating the cathode flow rate according to the present embodiment is described below with reference to FIGS. 2 to 4.

Figure 2:
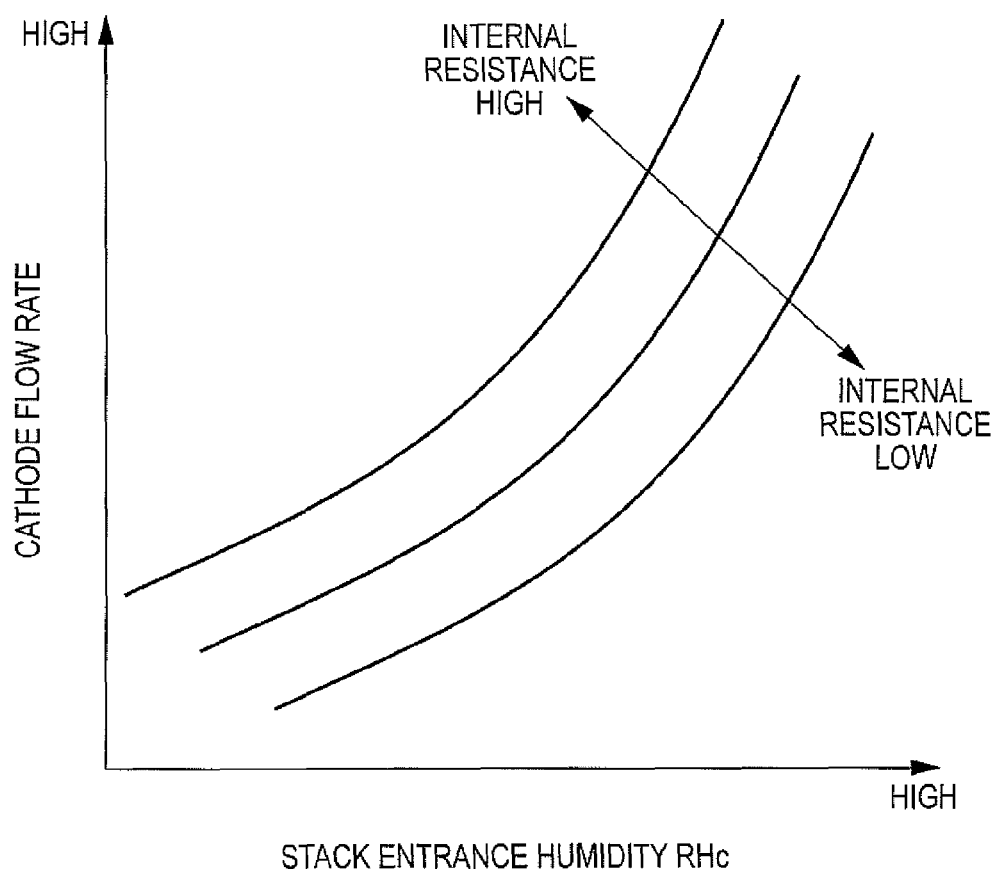
FIG. 2 is a graph showing a cathode flow rate necessary to maintain an internal resistance of a fuel cell stack at a certain fixed value in relation to a stack entrance humidity RHc of cathode gas.

FIG. 2 is a graph showing the cathode flow rate necessary to maintain the internal resistance of the fuel cell stack 1 at a certain fixed value in relation to a stack entrance humidity of the cathode gas.

As shown in FIG. 2, the cathode flow rate necessary to maintain the internal resistance at the certain fixed value increases with an increase in the stack entrance humidity of the cathode gas. Further, if the stack entrance humidity of the cathode gas is the same, the necessary cathode flow rate increases with an increase in the value at which the internal resistance is maintained.

This is because the electrolyte membrane becomes wetter as the stack entrance humidity of the cathode gas increases. To maintain the internal resistance at the fixed value, the cathode flow rate needs to be increased to dry the electrolyte membrane as the stack entrance humidity increases.

Figure 3:
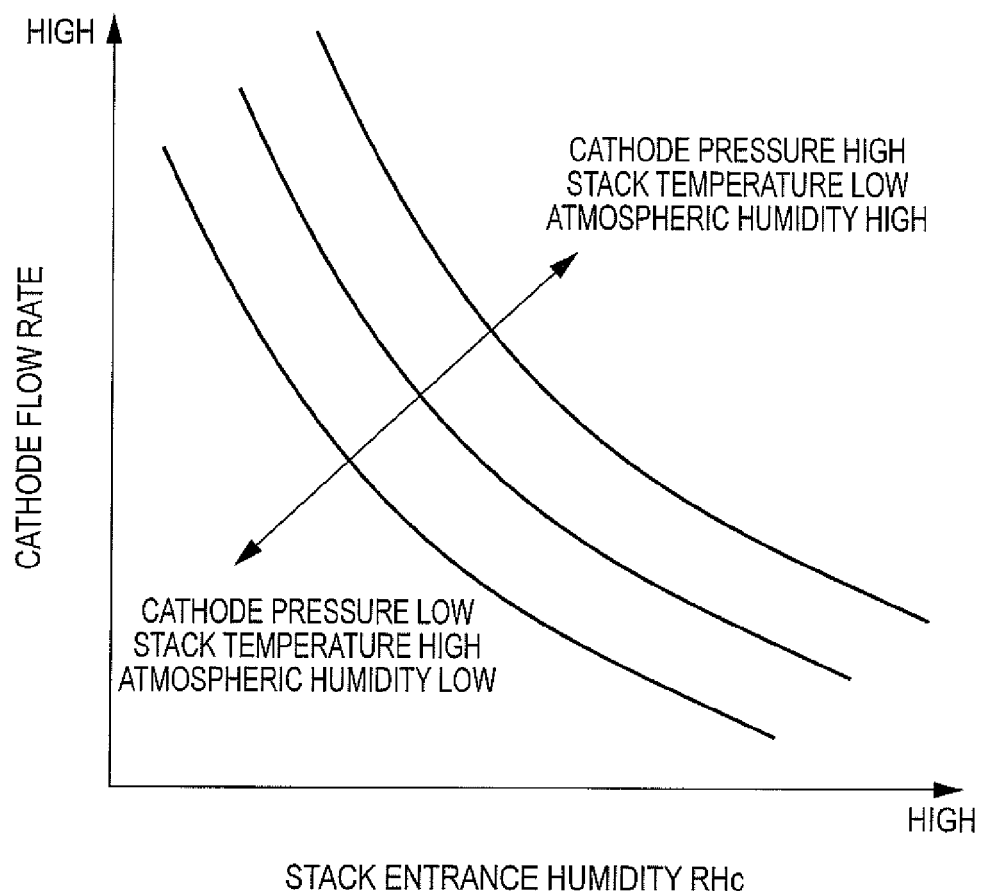
FIG. 3 is a graph showing the cathode flow rate when each of a cathode pressure, a stack temperature and an atmospheric humidity indicates a certain fixed value in relation to the stack entrance humidity RHc of the cathode gas.

FIG. 3 is a graph showing the cathode flow rate when each of the cathode pressure, the stack temperature and an atmospheric humidity indicates a certain fixed value in relation to the stack entrance humidity of the cathode gas.

As shown in FIG. 3, the stack entrance humidity of the cathode gas increases as the cathode flow rate decreases. Further, if the cathode flow rate is the same, the stack entrance humidity of the cathode gas increases as the cathode pressure increases, as the stack temperature decreases or as the atmospheric humidity increases. That is, the stack entrance humidity of the cathode gas increases as each of the parameters, i.e. the cathode pressure, the stack temperature and the atmospheric humidity changes to increase the internal, moisture content of the fuel cell stack 1.

This is due to a property of the WRD 36 to humidify the cathode gas to be supplied to the fuel cell stack 1 by moisture in the cathode off-gas.

Figure 4:
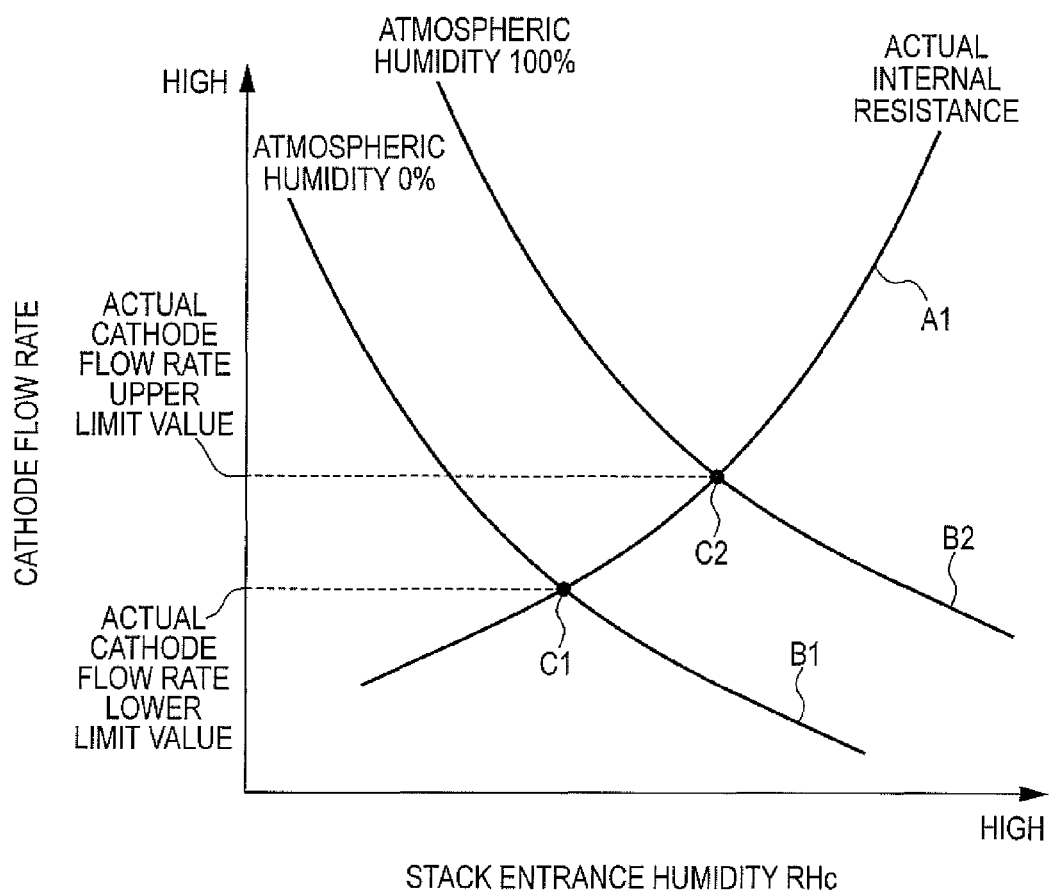
FIG. 4 is a graph showing a method for estimating the cathode flow rate based on the cathode pressure, the stack temperature and the internal resistance.

FIG. 4 is a graph showing a method for estimating the cathode flow rate based on the cathode pressure, the stack temperature and the internal resistance.

Although each of the cathode pressure, the stack temperature and the internal resistance is detected in the present embodiment, the atmospheric humidity is not detected.

Here, if the internal resistance is known, a solid line A1 shown in FIG. 4 can be drawn by obtaining a relationship of FIG. 2 described above by an experiment or the like in advance. The solid line A1 is a line representing the cathode flow rate estimated from the detected current internal resistance (hereinafter, referred to as "actual internal resistance") in relation to the stack entrance humidity of the cathode gas.

Further, if the cathode pressure and the stack temperature are known, a solid line B1 shown in FIG. 4 when the atmospheric humidity is assumed to be 0% and a solid line B2 shown in FIG. 4 when the atmospheric humidity is assumed to be 100% can be drawn by obtaining a relationship of FIG. 3 described above by an experiment or the like in advance even if the atmospheric humidity is not known.

The solid line B1 is a line representing the cathode flow rate estimated from the detected cathode pressure and stack temperature when the atmospheric humidity is assumed to be 0% in relation to the stack entrance humidity of the cathode gas. The solid line B2 is a line representing the cathode flow rate estimated from the detected cathode pressure and stack temperature when the atmospheric humidity is assumed to be 100% in relation to the stack entrance humidity of the cathode gas.

Then, the actual cathode flow rate (hereinafter, referred to as "actual cathode flow rate") can be estimated at least between the cathode flow rate at an intersection C1 of the solid lines A1, B1 (hereinafter, referred to as "actual cathode flow rate lower limit value") and the cathode flow rate at an intersection C2 of the solid lines A1, B2 (hereinafter, referred to as "actual cathode flow rate upper limit value").

Accordingly, if the cathode compressor 34 is so controlled that the actual cathode flow rate lower limit value does not fall below the minimum cathode flow rate, at least the actual cathode flow rate does not fall below the minimum cathode flow rate.

Thus, in the present embodiment, the actual cathode flow rate lower limit value is basically set as a cathode flow rate estimated value and the cathode pressure and the stack temperature are controlled to adjust the internal resistance to the target internal resistance according to need while the cathode compressor 34 is so controlled that the actual cathode flow rate lower limit value does not fall below the minimum cathode flow rate.

Next, a wet control of the electrolyte membrane for adjusting the internal resistance to the target internal resistance is described with reference to FIGS. 5 to 9.

Figure 5:
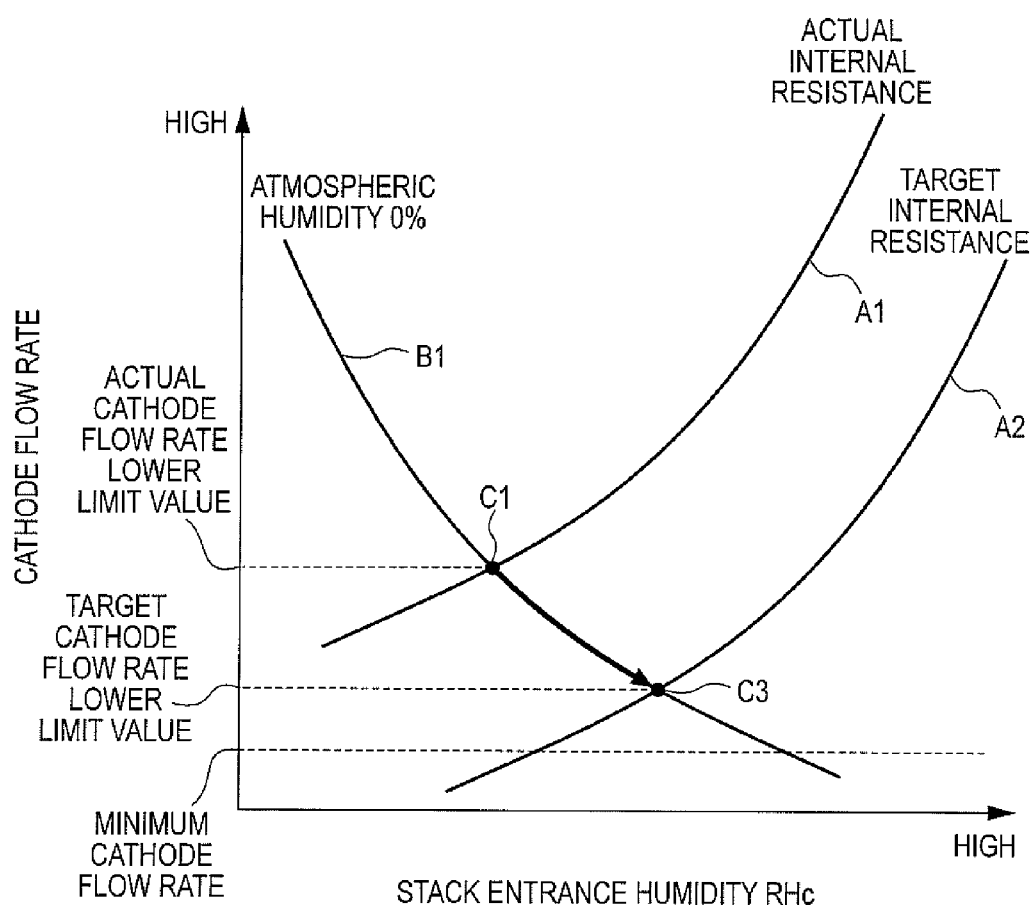
FIG. 5 is a graph showing a wet control of an electrolyte membrane when an actual internal resistance is higher than a target internal resistance.
Figure 6:
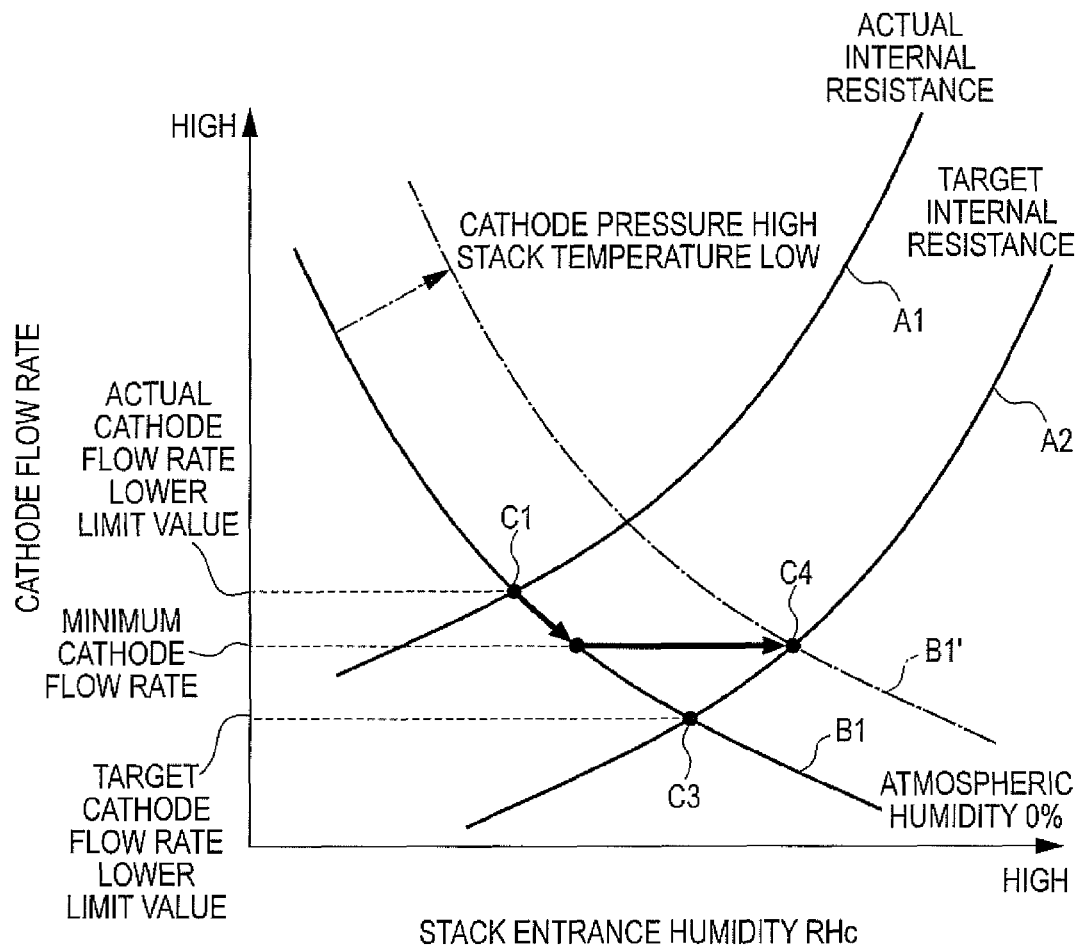
FIG. 6 is a graph showing the wet control of the electrolyte membrane when the actual internal resistance is higher than the target internal resistance.

FIGS. 5 and 6 are graphs showing the wet control of the electrolyte membrane when the actual internal resistance is higher than the target internal resistance.

In FIGS. 5 and 6, a solid line A2 is a line representing the cathode flow rate necessary to maintain the internal resistance at the target internal resistance in relation to the stack entrance humidity of the cathode gas. It should be noted that a solid line A1 is a line representing the cathode flow rate estimated from the detected current internal resistance (hereinafter, referred to as "actual internal resistance") in relation to the stack entrance humidity of the cathode gas as in FIG. 4. A solid line B1 is a line representing the cathode flow rate estimated from the detected cathode pressure and stack temperature when the atmospheric humidity is assumed to be 0% in relation to the stack entrance humidity of the cathode gas as in FIG. 4.

As shown in FIG. 5, if the actual internal resistance is higher than the target internal resistance and the cathode flow rate at an intersection C3 of the solid lines A2 and B1 (hereinafter, referred to as "target cathode flow rate lower limit value") is not lower than the minimum cathode flow rate, the actual internal resistance can be converged to the target internal resistance by controlling the cathode compressor 34 such that the cathode flow rate is reduced by a difference between the actual cathode flow rate lower limit value and the target cathode flow rate lower limit value.

However, if the target cathode flow rate lower limit value is smaller than the minimum cathode flow rate as shown in FIG. 6, the cathode flow rate can be reduced only to the minimum cathode flow rate without being able to be reduced to the target cathode flow rate lower limit value. This is because the output power falls below the required output power if the cathode flow rate is reduced to the target cathode flow rate lower limit value when the target cathode flow rate lower limit value is smaller than the minimum cathode flow rate.

Accordingly, in such a case, the internal resistance is converged to the target internal resistance by controlling one or both of the cathode pressure and the stack temperature after the cathode compressor 34 is controlled to reduce the cathode flow rate by the difference between the actual cathode flow rate lower limit value and the minimum cathode flow rate. Specifically, the solid line B1 is moved to a solid line B1' by increasing the cathode pressure or decreasing the stack temperature, thereby converging the internal resistance to the target internal resistance. The solid line B1' is a line on which the cathode flow rate at an intersection C4 of the solid lines A2, B1' is the minimum cathode flow rate.

Next, the wet control of the electrolyte membrane when the actual internal resistance is lower than the target internal resistance is described with reference to FIGS. 7 to 10.

Figure 7:
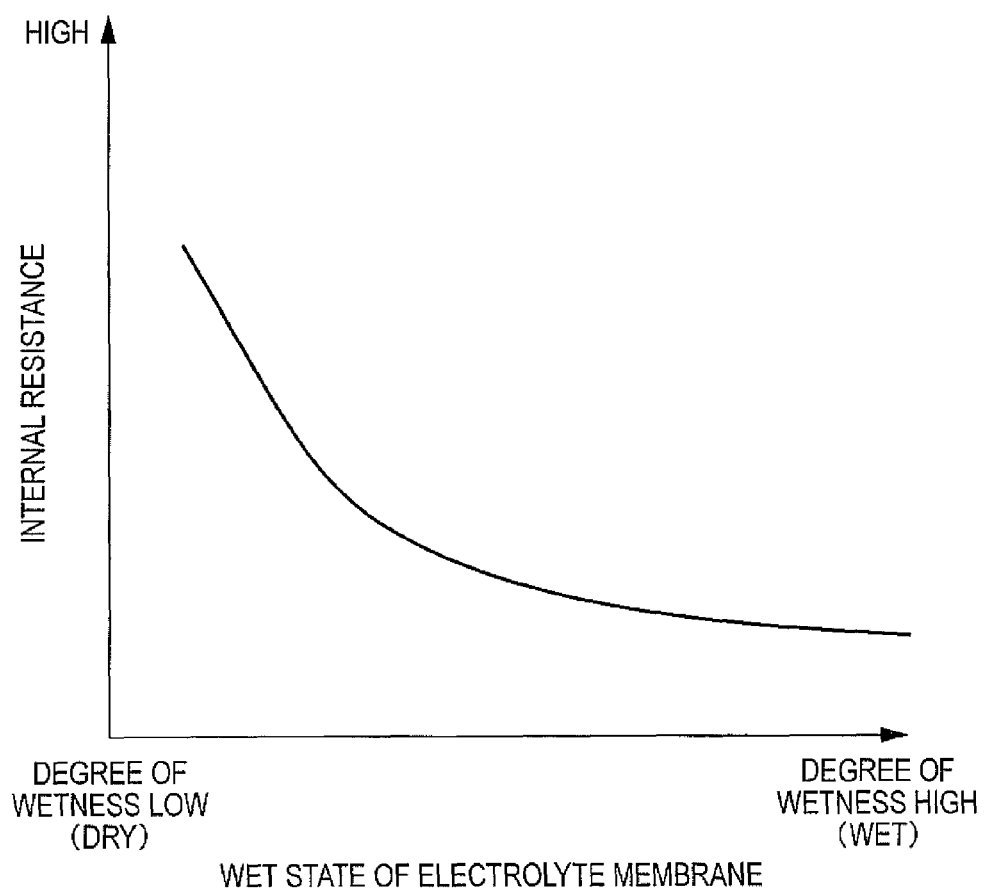
FIG. 7 is a graph showing a relationship between a wet state of the electrolyte membrane and the internal resistance.

FIG. 7 is a graph showing a relationship between the wet state of the electrolyte membrane and the internal resistance.

As shown in FIG. 7, the internal resistance of the fuel cell stack 1 changes according to the wet state of the electrolyte membrane. The drier the electrolyte membrane, the higher the internal resistance. An amount of change of the internal resistance according to a change in the wet state of the electrolyte membrane is larger when a degree of wetness of the electrolyte membrane is low, i.e. when the electrolyte membrane is relatively dry. Conversely, the amount of change of the internal resistance when the wet state of the electrolyte membrane changes is smaller when the degree of wetness of the electrolyte membrane is high, i.e. when the electrolyte membrane is relatively wet.

Thus, estimation accuracy may fall if the cathode flow rate is estimated based on the cathode pressure, the stack temperature and the actual internal resistance when the electrolyte membrane is relatively wet and the actual internal resistance is low.

Figure 8:
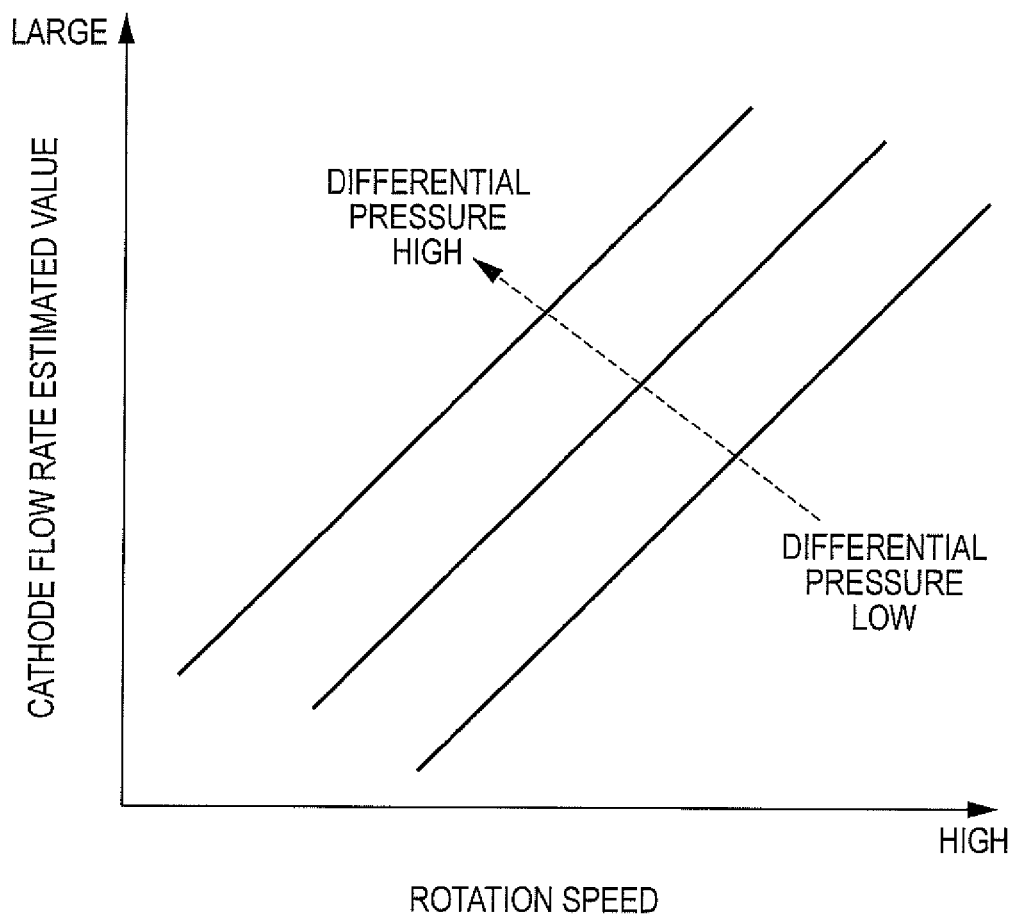
FIG. 8 is a map for estimating the cathode flow rate based on a rotation speed of a cathode compressor and a differential pressure before and after the cathode compressor.

Accordingly, in the present embodiment, a map of FIG. 8 is exceptionally referred to and the cathode flow rate is estimated based on a rotation speed of the cathode compressor 34 and a differential pressure before and after the cathode compressor 34 when the actual internal resistance is lower than the target internal resistance.

FIG. 8 is the map for estimating the cathode flow rate based on the rotation speed of the cathode compressor 34 and the differential pressure before and after the cathode compressor 34.

As shown in FIG. 8, the cathode flow rate estimated value increases as the rotation speed of the cathode compressor 34 increases and as the differential pressure before and after the cathode compressor 34 increases.

Figure 9:
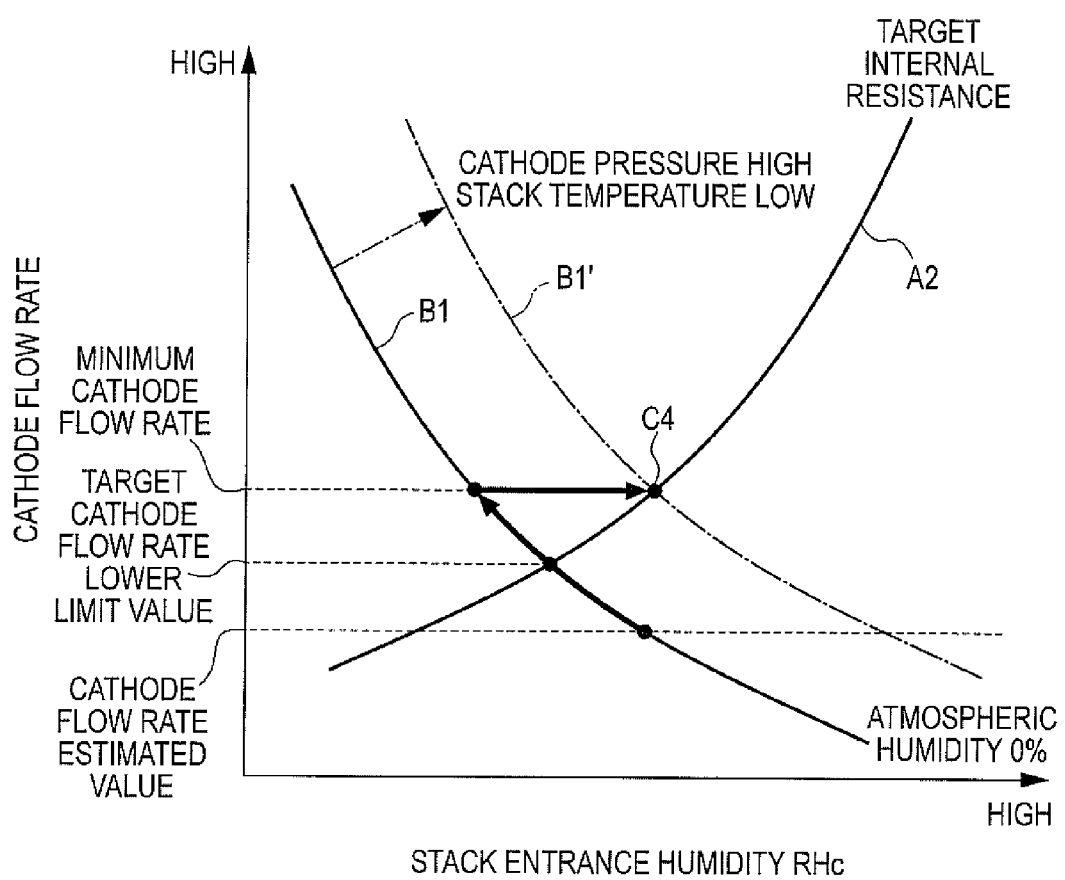
FIG. 9 is a graph showing the wet control of the electrolyte membrane when the actual internal resistance is lower than the target internal resistance.
Figure 10:
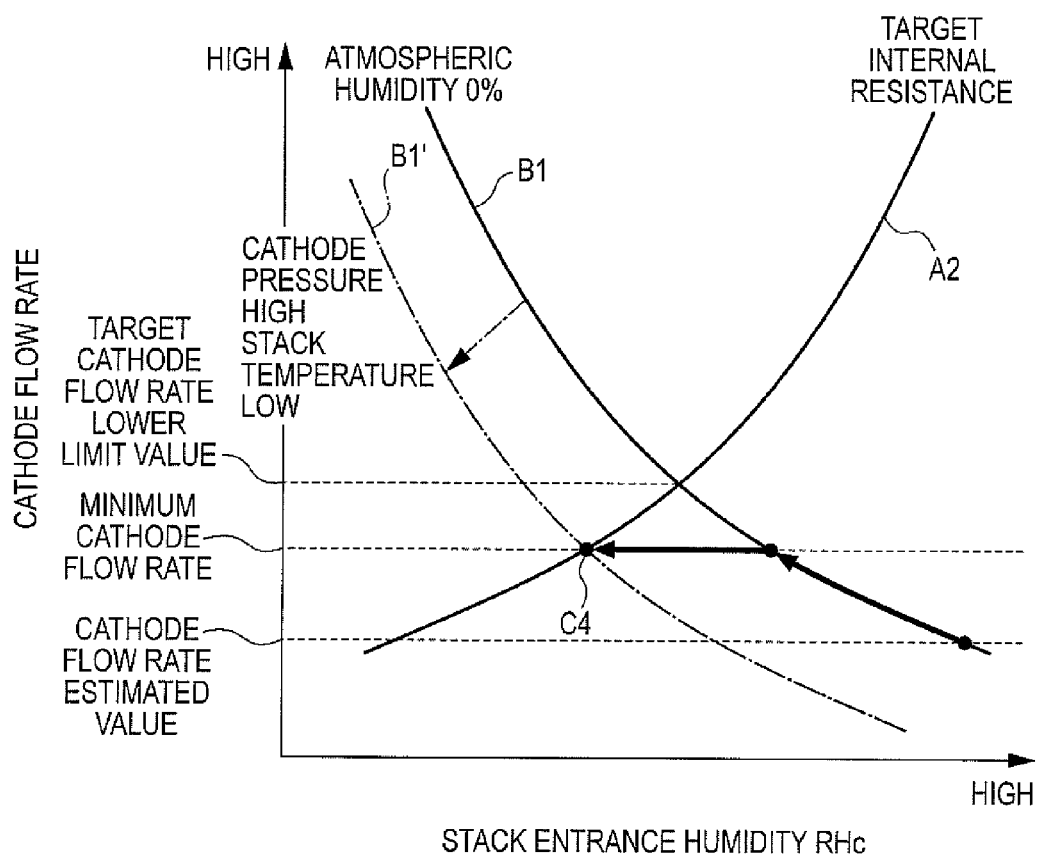
FIG. 10 is a graph showing the wet control of the electrolyte membrane when the actual internal resistance is lower than the target internal resistance.

FIGS. 9 and 10 are graphs showing the wet control of the electrolyte membrane when the actual internal resistance is lower than the target internal resistance.

In FIGS. 9 and 10, a solid line A2 is a line representing the cathode flow rate necessary to maintain the internal resistance at the target internal resistance in relation to the stack entrance humidity of the cathode gas as in FIG. 5. A solid line B1 is a line representing the cathode flow rate estimated from the detected cathode pressure and stack temperature when the atmospheric humidity is assumed to be 0% in relation to the stack entrance humidity of the cathode gas as in FIG. 4.

As shown in FIG. 9, if the minimum cathode flow rate is higher than the target cathode flow rate lower limit value, the cathode compressor 34 is so controlled as to increase the cathode flow rate by a difference between the minimum cathode flow rate and an estimated value of the cathode flow rate estimated based on the rotation speed of the cathode compressor 34 and the differential pressure before and after the cathode compressor 34 (hereinafter, referred to as "cathode flow rate estimated value"). Thereafter, the solid line B1 is moved to a solid line B1' by increasing the cathode pressure or decreasing the stack temperature, thereby converging the internal resistance to the target internal resistance.

On the other hand, if the minimum cathode flow rate is lower than the target cathode flow rate lower limit value as shown in FIG. 10, the cathode compressor 34 is so controlled as to increase the cathode flow rate by the difference between the minimum cathode flow rate and the cathode flow rate estimated value. Thereafter, the solid line B1 is moved to the solid line B1' by decreasing the cathode pressure or increasing the stack temperature, thereby converging the internal resistance to the target internal resistance.

The wet control of the electrolyte membrane according to the present embodiment is described below.

Figure 11:
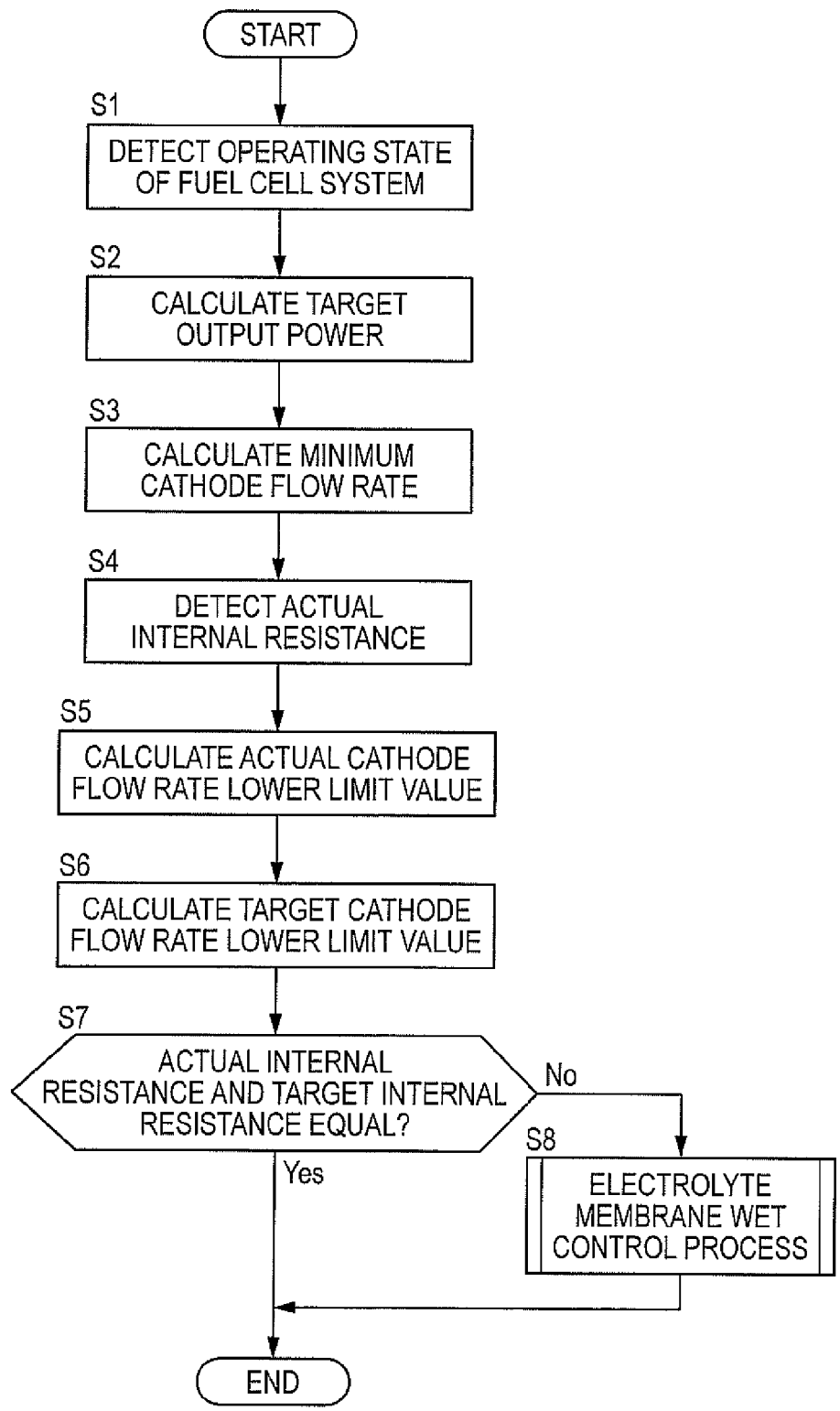
FIG. 11 is a flow chart showing the wet control of the electrolyte membrane according to the first embodiment of the present invention.

FIG. 11 is a flow chart showing the wet control of the electrolyte membrane according to the present embodiment.

In Step S1, the controller 5 reads detection signals of various sensors and detects an operating state of the fuel cell system 100.

In Step S2, the controller 5 calculates the required output power based on the operating state of the fuel cell system 100.

In Step S3, the controller 5 calculates the minimum cathode flow rate based on the required output power. The minimum cathode flow rate decreases as the required output power decreases.

In Step S4, the controller 5 detects the actual internal resistance of the fuel cell stack 1. Specifically, an alternating current is superimposed on an output current of the fuel cell stack 1 by controlling, for example, a DC/DC converter (not shown) or the like, and detects a voltage value of the fuel cell stack 11 at that time by a voltage sensor. A voltage amplitude of the superimposed alternating current is computed based on the voltage value and the internal resistance of the fuel cell is computed by dividing the voltage amplitude by a current amplitude of the superimposed alternating current.

In Step S5, the controller 5 calculates the actual cathode flow rate lower limit value based on the cathode pressure, the stack temperature and the actual internal resistance.

In Step S6, the controller 5 calculates the target cathode flow rate lower limit value based on the cathode pressure, the stack temperature and the predetermined target internal resistance set in advance.

In Step S7, the controller 5 determines whether or not the actual internal resistance and the target internal resistance are equal. Specifically, if an absolute value of a difference between the actual internal resistance and the target internal resistance is not larger than a predetermined value, the actual internal resistance and the target internal resistance are determined to be equal. If the actual internal resistance and the target internal resistance are equal, the controller 5 finishes the process this time. On the other hand, a processing of Step S8 is performed unless the actual internal resistance and the target internal resistance are equal.

In Step S8, the controller 5 performs an electrolyte membrane wet control process. The electrolyte membrane wet control process is described in detail below with reference to FIG. 12.

Figure 12:
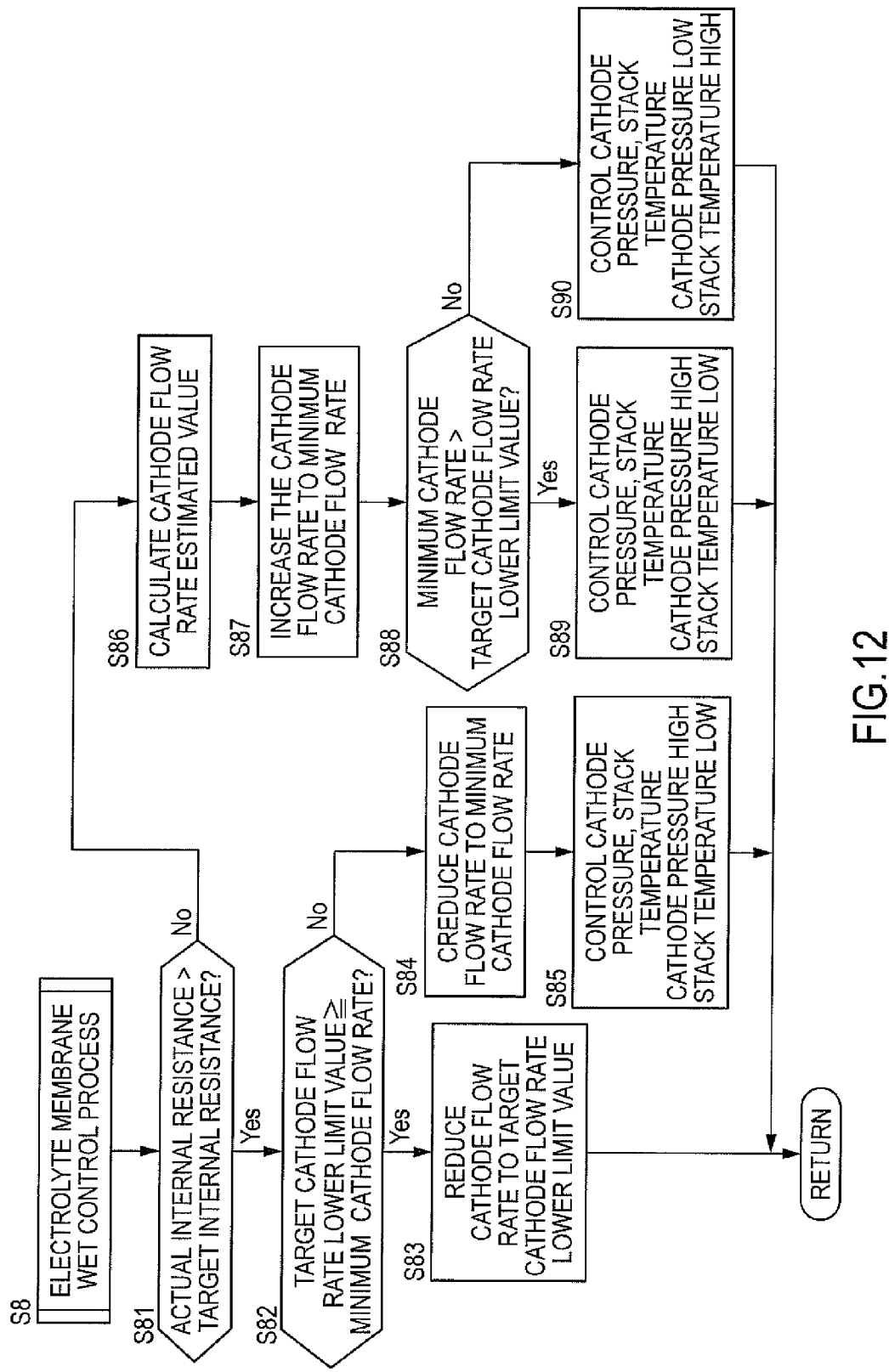
FIG. 12 is a flow chart showing an electrolyte membrane wet control process.

FIG. 12 is a flow chart showing the electrolyte membrane wet control process.

In Step S81, the controller 5 determines whether or not the actual internal resistance is higher than the target internal resistance. The controller 5 performs a processing of Step S82 if the actual internal resistance is higher than the target internal resistance. On the other hand, a processing of Step S86 is performed if the actual internal resistance is not higher than the target internal resistance.

In Step S82, the controller 5 determines whether or not the target cathode flow rate lower limit value is not smaller than the minimum cathode flow rate. The controller 5 performs a processing of Step S83 if the target cathode flow rate lower limit value is not smaller than the minimum cathode flow rate. On the other hand, a processing of Step S84 is performed if the target cathode flow rate lower limit value is smaller than the minimum cathode flow rate.

In Step S83, the controller 5 controls the cathode compressor 34 to reduce the cathode flow rate by the difference between the actual cathode flow rate lower limit value and the target cathode flow rate lower limit value. This causes the internal resistance to converge to the target internal resistance (see FIG. 5).

In Step S84, the controller 5 controls the cathode compressor 34 to reduce the cathode flow rate by a difference between the actual cathode flow rate lower limit value and the minimum cathode flow rate (see FIG. 6).

In Step S85, the controller 5 controls one or both of the cathode pressure and the stack temperature so that the internal resistance becomes the target internal resistance. Specifically, the cathode pressure is increased in the case of controlling the cathode pressure and the stack temperature is decreased in the case of controlling the stack temperature. This causes the internal resistance to converge to the target internal resistance (see FIG. 6).

In Step S86, the controller 5 refers to the map of FIG. 9 and calculates the cathode flow rate estimated value based on the rotation speed of the cathode compressor 34 and the differential pressure before and after the cathode compressor 34.

In Step S87, the controller 5 controls the cathode compressor 34 to increase the cathode flow rate by the difference between the minimum cathode flow rate and the cathode flow rate estimated value (see FIGS. 8 and 9).

In Step S88, the controller 5 determines whether or not the minimum cathode flow rate is higher than the target cathode flow rate lower limit value. The controller 5 performs a processing of Step S89 if the minimum cathode flow rate is higher than the target cathode flow rate lower limit value. On the other hand, a processing of Step S90 is performed if the minimum cathode flow rate is not higher than the target cathode flow rate.

In Step S89, the controller 5 controls one or both of the cathode pressure and the stack temperature so that the internal resistance becomes the target internal resistance. Specifically, the cathode pressure is increased in the case of controlling the cathode pressure and the stack temperature is decreased in the case of controlling the stack temperature (see FIG. 8).

In Step S90, the controller 5 controls one or both of the cathode pressure and the stack temperature so that the internal resistance becomes the target internal resistance. Specifically, the cathode pressure is decreased in the case of controlling the cathode pressure and the stack temperature is increased in the case of controlling the stack temperature (see FIG. 9).

Functions and effects according to the present embodiment are described below.

In the case of executing a control to prevent the cathode flow rate detected by the air flow sensor 35 from falling below the minimum cathode flow rate, the cathode flow rate can be reduced only to the flow rate, which is the minimum cathode flow rate plus the sufficient margin, due to the influence of the detection accuracy of the air flow sensor 35.

Contrary to this, according to the present embodiment, a minimum value of the flow rate considered to be the current cathode flow rate, i.e. the actual cathode flow rate lower limit value is calculated based on the cathode pressure, the stack temperature and the internal resistance, and the calculated value is set as the cathode flow rate estimated value.

Since this enables the cathode flow rate to be estimated with high accuracy, the cathode flow rate can be reduced to a flow rate closer to the minimum cathode flow rate as compared with the case of executing the control to prevent the cathode flow rate detected by the air flow sensor 35 from falling below the minimum cathode flow rate. Thus, the cathode compressor 34 can be operated at low rotation, wherefore the fuel economy of the fuel cell system 100 can be improved.

Further, according to the present embodiment, the cathode pressure and the stack temperature are controlled to adjust the internal resistance to the target internal resistance according to need while the cathode compressor 34 is controlled to prevent the actual cathode flow rate lower limit value from falling below the minimum cathode flow rate determined according to the operating state of the fuel cell system 100.

Since this enables the wet state of the electrolyte membrane to be maintained in an optimal state, the power generation efficiency of the fuel cell system 100 can be improved.

Further, according to the present embodiment, the cathode flow rate is estimated based on the rotation speed of the cathode compressor 34 and the differential pressure before and after the cathode compressor 34 when the internal resistance of the fuel cell stack 1 is higher than a predetermined value and estimation accuracy when the cathode flow rate is estimated based on the cathode pressure, the stack temperature and the internal resistance may fall.

Since this enables the estimation accuracy of the cathode flow rate to be maintained, the cathode flow rate can be reliably prevented from falling below the minimum cathode flow rate and the cathode compressor 34 can be operated at low rotation, wherefore the fuel economy of the fuel cell system 100 can be improved.

(Second Embodiment)

Next, a second embodiment of the present invention is described. In the present embodiment, the cathode compressor 34 is feedback-controlled using an estimated cathode flow rate instead of the cathode flow rate detected by the air flow sensor 35 in a region where the detection accuracy of the air flow sensor 35 is low. It should be noted that, in the following embodiment, components having functions similar to those of the first embodiment described above are denoted by the same reference signs and repeated description is omitted as appropriate.

As described above, the detection accuracy of the air flow sensor 35 tends to decrease with a decrease in the cathode flow rate.

Accordingly, in the present embodiment, the cathode compressor 34 is feedback-controlled using the estimated cathode flow rate in the region where the detection accuracy of the air flow sensor 35 is low, i.e. the cathode flow rate detected by the air flow sensor 35 is below a predetermined flow rate.

Specifically, in the region where the cathode flow rate detected by the air flow sensor 35 is below the predetermined flow rate, the cathode compressor 34 is feedback-controlled based on the estimated cathode flow rate and a target value of the cathode gas to be supplied to the fuel cell stack 1 (hereinafter, referred to as "target cathode flow rate") so that the estimated cathode flow rate becomes the target cathode flow rate. On the other hand, in a region where the cathode flow rate detected by the air flow sensor 35 is not below the predetermined flow rate, the cathode compressor 34 is feedback-controlled based on the cathode flow rate detected by the air flow sensor 35 and the target cathode flow rate so that the detected cathode flow rate becomes the target cathode flow rate.

A control of the cathode compressor 34 according to this embodiment is described below with reference to a flow chart of FIG. 13.

Figure 13:
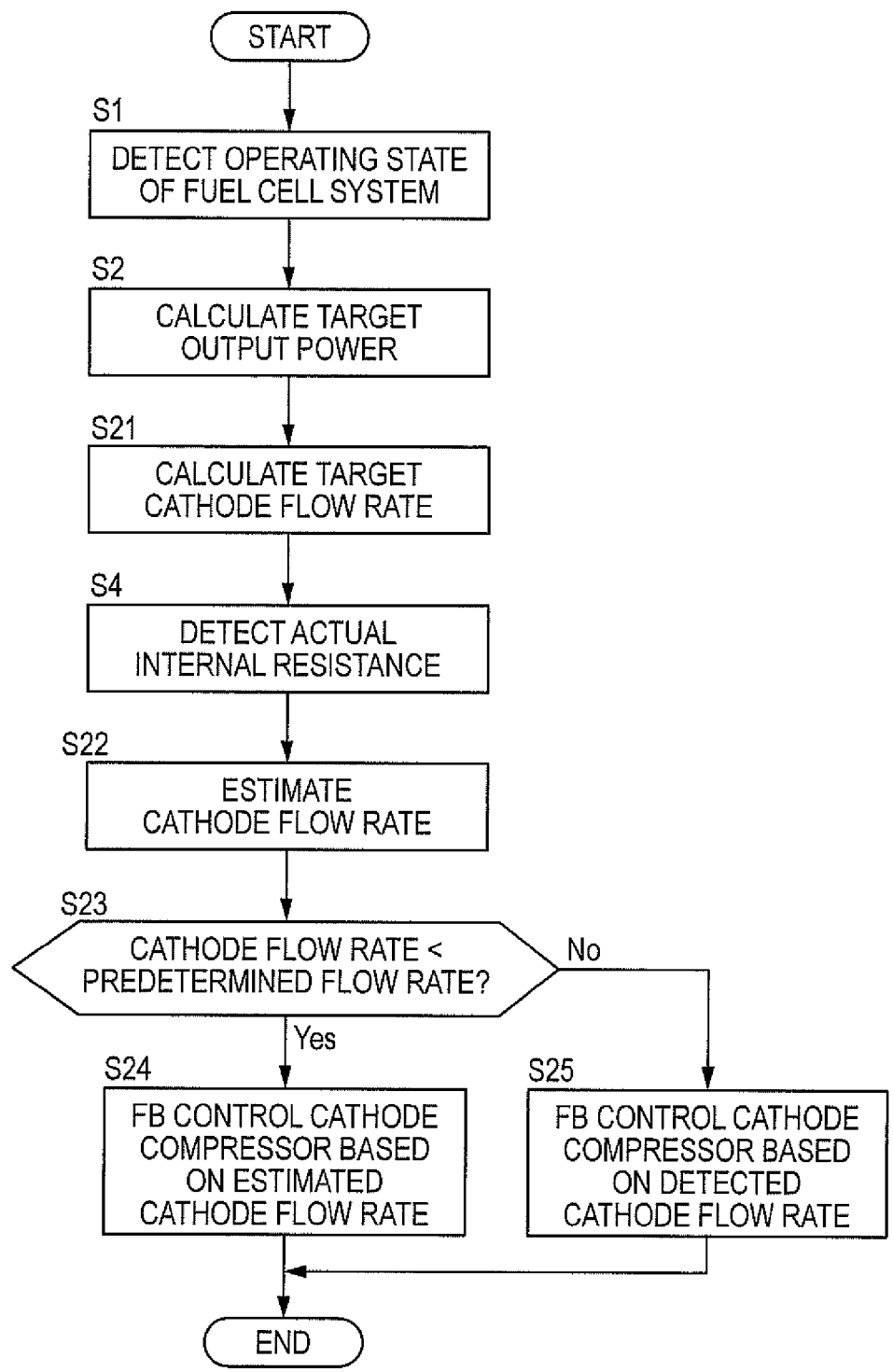
FIG. 13 is a flow chart showing a control of a cathode compressor according to a second embodiment of the present invention.

FIG. 13 is the flow chart showing the control of the cathode compressor 34 according to this embodiment.

In Step S21, the controller 5 calculates the target cathode flow rate based on the operating state of the fuel cell system 100. The target cathode flow rate is a flow rate capable of also preventing flooding while satisfying target output power.

In Step S22, the controller 5 sets an actual cathode flow rate lower limit value calculated based on the cathode pressure, the stack temperature and the actual internal resistance as an estimated value of the cathode flow rate.

In Step S23, the controller 5 determines whether or not the cathode flow rate detected by the air flow sensor 35 is below the predetermined flow rate. The controller 5 performs a processing of S24 if the cathode flow rate detected by the air flow sensor 35 is below the predetermined flow rate. On the other hand, a processing of Step S25 is performed if the cathode flow rate detected by the air flow sensor 35 is not below the predetermined flow rate.

In Step S24, the controller 5 feedback-controls the cathode compressor 34 based on the estimated value of the cathode flow rate and the target cathode flow rate so that the estimated value of the cathode flow rate becomes the target cathode flow rate.

In Step S25, the controller 5 feedback-controls the cathode compressor 34 based on the cathode flow rate detected by the air flow sensor 35 and the target cathode flow rate so that the detected cathode flow rate becomes the target cathode flow rate.

According to the present embodiment described above, the cathode compressor 34 is feedback-controlled toward the target cathode flow rate using the more accurate estimated cathode flow rate instead of the cathode flow rate detected by the air flow sensor 35 in the region where the detection accuracy of the air flow sensor 35 is low.

Since this eliminates the need for setting the target cathode flow rate higher than necessary for safety in the region where the detection accuracy of the air flow sensor 35 is low, the cathode compressor 34 can be operated at low rotation and the fuel economy of the fuel cell system 100 can be improved.

Although the embodiments of the present invention have been described above, the above embodiments are only an illustration of some application examples of the present invention and not intended to limit the technical scope of the present invention to the specific configurations of the above embodiments.

In the above first embodiment, since estimation accuracy may fall if the cathode flow rate is estimated based on the stack temperature and the actual internal resistance when the actual internal resistance is relatively low, the cathode flow rate is estimated according to the operating state of the cathode compressor 34 in such a case.

However, the cathode flow rate may be estimated based on the cathode pressure, the stack temperature and the actual internal resistance regardless of the magnitude of the actual internal resistance by correcting to increase the minimum cathode flow rate with a decrease in the actual internal resistance. By doing so, even if the estimation accuracy of the cathode flow rate is slightly degraded, the fall of the actual cathode flow rate below the minimum cathode flow rate can be suppressed, with the result that the deterioration of power generation efficiency can be prevented.

Further, in the above first embodiment, the cathode flow rate is estimated based on the cathode pressure, the stack temperature and the actual internal resistance, assuming that the atmospheric humidity is 0%.

However, in the case of including a humidity sensor for detecting the atmospheric humidity, the estimated cathode flow rate may be corrected according to a detection value of the humidity sensor. Specifically, the estimated cathode flow rate may be corrected to increase with an increase in the atmospheric humidity. This enables the cathode flow rate to be estimated with higher accuracy.

Further, in the above first embodiment, the wet control of the electrolyte membrane may be executed only in the region where the detection accuracy of the air flow sensor 35 is low.

The present application claims a priority of Japanese Patent Application No. 2012-2278 filed with the Japan Patent Office on Jan. 10, 2012, all the contents of which are hereby incorporated by reference.

The invention claimed is:

1. A fuel cell system configured to generate power by supplying anode gas and cathode gas to a fuel cell, comprising:
   a cathode gas supply unit configured to supply the cathode gas to the fuel cell;
   a cathode pressure detection unit configured to detect a pressure of the cathode gas to be supplied to the fuel cell;
   a fuel cell temperature detection unit configured to detect a temperature of the fuel cell;
   an internal resistance detection unit configured to detect an internal resistance of the fuel cell;
   a target cathode flow rate calculation unit configured to calculate a target cathode flow rate necessary for supply to the fuel cell based on an operating state of the fuel cell system;
   a cathode flow rate estimation unit configured to estimate a flow rate of the cathode gas according to the pressure of the cathode gas, the temperature of the fuel cell and the internal resistance of the fuel cell; and
   a cathode flow rate control unit configured to control the cathode gas supply unit based on the target cathode flow rate and the estimated flow rate of the cathode gas.

2. The fuel cell system according to claim 1, wherein the cathode flow rate estimation unit increases an estimated value of the flow rate of the cathode gas with an increase in the internal resistance of the fuel cell.

3. The fuel cell system according to claim 1, wherein the cathode flow rate estimation unit increases an estimated value of the flow rate of the cathode gas with an increase in the pressure of the cathode gas.

4. The fuel cell system according to claim 1, wherein the cathode flow rate estimation unit increases an estimated value of the flow rate of the cathode gas with a decrease in the temperature of the fuel cell.

5. The fuel cell system according to claim 1, wherein the cathode flow rate estimation unit estimates the flow rate of the cathode gas, assuming that an atmospheric humidity has a minimum value in an external environment where the fuel cell is used.

6. The fuel cell system according to claim 1, comprising an atmospheric humidity detection unit configured to detect an atmospheric humidity, wherein:
   the cathode flow rate estimation unit corrects to increase an estimated value of the flow rate of the cathode gas estimated according to the pressure of the cathode gas, the temperature of the fuel cell and the internal resistance of the fuel cell with an increase in the atmospheric humidity.

7. The fuel cell system according to claim 1, comprising an internal resistance control unit configured to control the internal resistance of the fuel cell to a predetermined target internal resistance, wherein:
   the internal resistance control unit controls the internal resistance of the fuel cell to the predetermined target internal resistance by increasing the pressure of the cathode gas if the internal resistance of the fuel cell is higher than the target internal resistance when the estimated flow rate of the cathode gas and the target cathode flow rate are equal.

8. The fuel cell system according to claim 1, comprising an internal resistance control unit configured to control the internal resistance of the fuel cell to a predetermined target internal resistance, wherein:
   the internal resistance control unit controls the internal resistance of the fuel cell to the predetermined target internal resistance by decreasing the temperature of the fuel cell if the internal resistance of the fuel cell is higher than the target internal resistance when the estimated flow rate of the cathode gas and the target cathode flow rate are equal.

9. The fuel cell system according to claim 1, wherein the cathode flow rate estimation unit:
   estimates the flow rate of the cathode gas according to the pressure of the cathode gas, the temperature of the fuel cell and the internal resistance of the fuel cell when the internal resistance of the fuel cell is higher than a predetermined value; and
   estimates the flow rate of the cathode gas based on a rotation speed of a compressor for feeding the cathode gas under pressure to the fuel cell and a differential pressure before and after the compressor when the internal resistance of the fuel cell is lower than the predetermined value.

10. The fuel cell system according to claim 1, wherein the target cathode flow rate calculation unit corrects to increase the target cathode flow rate with an increase in the internal resistance of the fuel cell.

11. The fuel cell system according to claim 1, comprising a cathode flow rate detection unit configured to detect a flow rate of the cathode gas to be supplied to the fuel cell, wherein:
   the cathode flow rate control unit controls the cathode gas supply unit based on the target cathode flow rate and the estimated flow rate of the cathode gas when the flow rate of the cathode gas is lower than a predetermined flow rate.

* * * * *